United States Patent [19]

Dietrich

[11] 4,282,935
[45] Aug. 11, 1981

[54] MULTIPLE SECTION, ADJUSTABLE WIDTH PLOW

[75] Inventor: William J. Dietrich, Congerville, Ill.

[73] Assignee: DMI, Inc., Goodfield, Ill.

[21] Appl. No.: 76,588

[22] Filed: Sep. 18, 1979

[51] Int. Cl.³ .................. A01B 69/00; A01B 69/08; A01B 63/22
[52] U.S. Cl. ............................ 172/284; 172/647; 172/413
[58] Field of Search ............ 172/283, 284, 647, 286, 172/285

[56] References Cited

U.S. PATENT DOCUMENTS

| | | | |
|---|---|---|---|
| 2,982,363 | 5/1961 | Sweet et al. | 172/284 |
| 3,817,333 | 6/1974 | Kinzenbaw | 172/283 |
| 3,965,989 | 6/1976 | Ward | 172/310 |
| 4,036,305 | 7/1977 | Kinzenbaw | 172/647 X |
| 4,036,306 | 7/1977 | Kinzenbaw | 172/647 |
| 4,049,063 | 9/1977 | Dietrich | 172/647 X |
| 4,077,651 | 3/1978 | Steinbach et al. | 172/283 X |
| 4,098,346 | 7/1978 | Stanfill et al. | 172/283 |
| 4,186,806 | 2/1980 | Ward | 172/283 |

Primary Examiner—George J. Marlo
Attorney, Agent, or Firm—Emrich, Root, Lee, Brown & Hill

[57] ABSTRACT

An adjustable width plow having at least three aligned sections with adjacent ends of the sections joined for relative motion about horizontal axes includes a forward furrow wheel mounted to the forward end of the front plow section for caster movement, a rear furrow wheel mounted to the rear end of the rear plow section for caster movement, a first or forward pair of land wheels supporting the plow adjacent the rear end of the forward section, and a second or rear pair of land wheels supporting the plow adjacent the rear end of the intermediate plow section. A steering mechanism controls the forward land wheels in turns in response to the turning of the tractor pulling the plow, and this steering mechanism also adjusts the forward land wheels for proper steering and toeing as the width of the furrow cut by the plows is adjusted. The rear land wheels are not steered in response to the turning of the tractor, but they are adjusted for proper steering and toeing when the plow units are adjusted. A hydraulic ram is included in the steering mechanism for each set of land wheels to turn them to the right when the ram is extended to facilitate turning the system to the right when the plow units are in the fully-closed road travel position. Actuation of the width adjustment cylinder also adjusts the spacing between the tractor and the furrow wheel on the unit to at least partly compensate for changes in draft.

10 Claims, 9 Drawing Figures

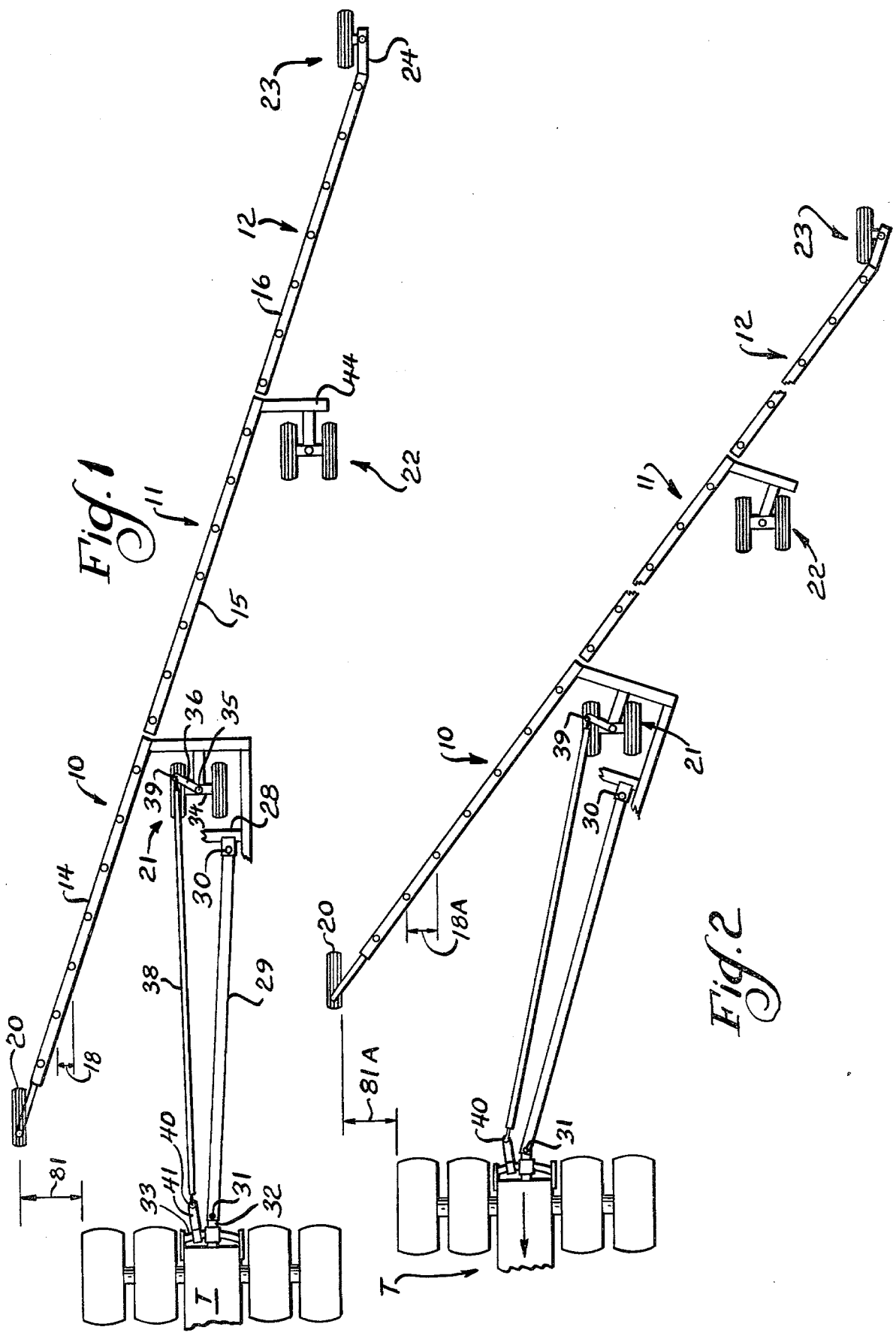

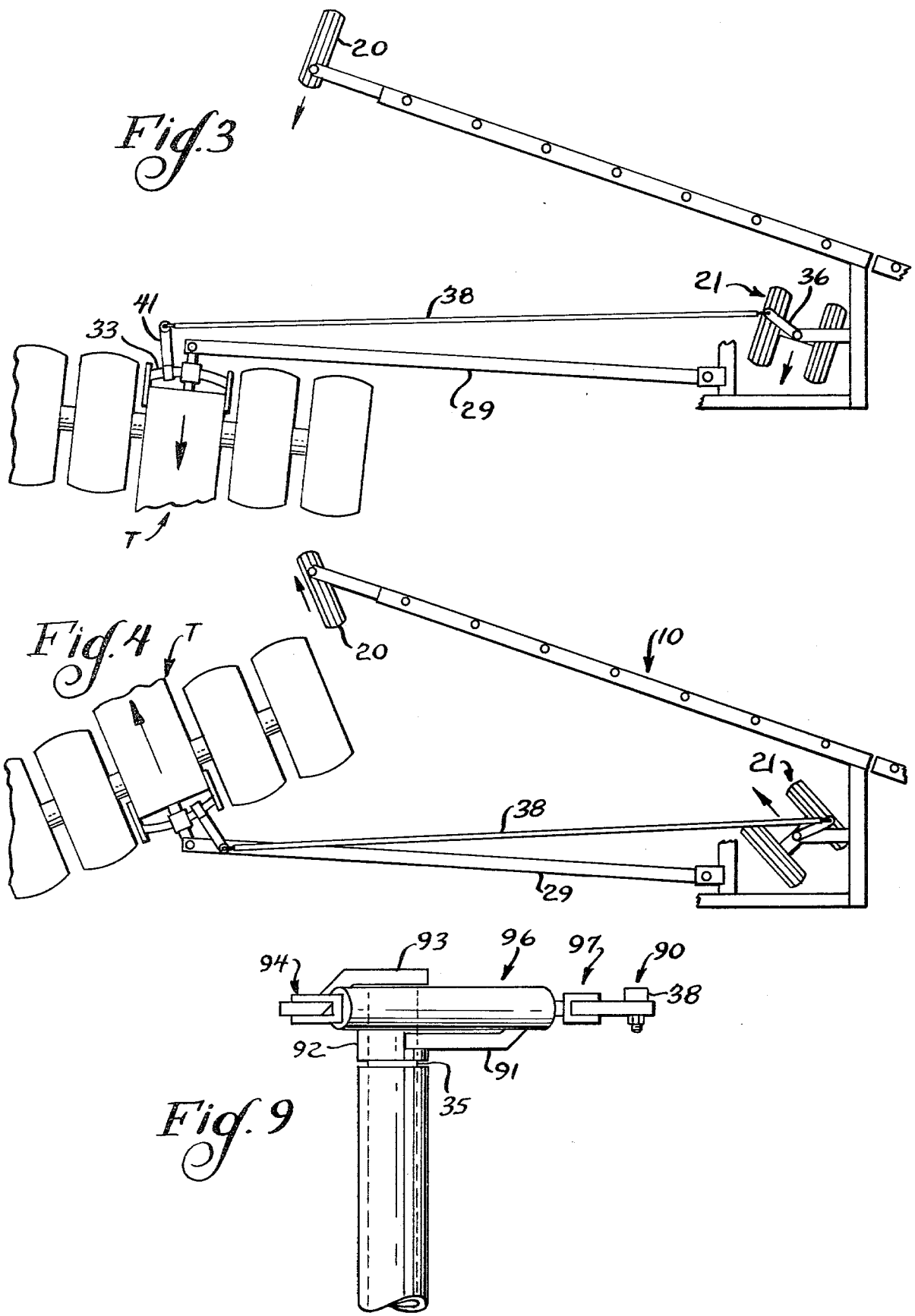

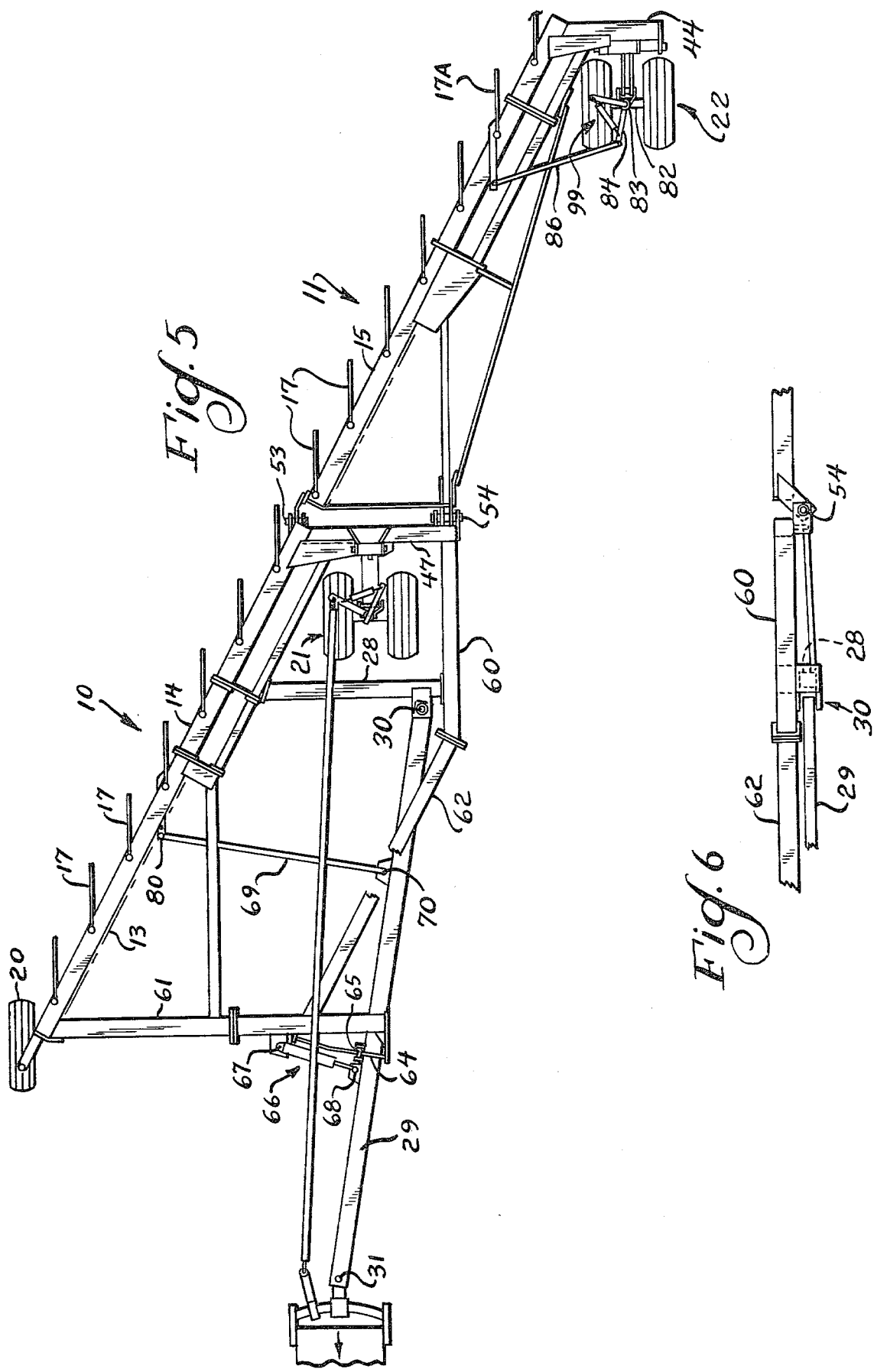

MULTIPLE SECTION, ADJUSTABLE WIDTH PLOW

BACKGROUND AND SUMMARY

The present invention relates to moldboard plows; and in particular it relates to a multiple section, adjustable width plow.

The current trend in tractors is to provide them with ever increasing amounts of power. Large tractors of this type typically are provided with four wheel drive; and this increased power and traction have greatly expanded the capacity of tractors to pull agricultural implements, such as tillage implements. It is desirable to match the load on a tractor to its power so that the tractor operates more efficiently and fuel is not wasted. Thus, there is a trend toward larger and larger implements.

Another feature which is being offered by more manufacturers of moldboard plows, because it is advantageous to a farmer in the field, is the ability to adjust the cutting width of a moldboard plow, particularly without requiring that the farmer stop the tractor and get off and make a manual adjustment. This type of system is sometimes referred to as an adjustable width plow, and the ability to adjust the width of the plow without having to stop the tractor is sometimes described as being adjustable "on the go". A moldboard plow which is adjustable on the go is described in the Kinzenbaw U.S. Pat. No. 3,817,333, granted June 18, 1974. As indicated in this patent, there are two types of steering with which a plow of this type must be concerned. The first type of steering is conventional, namely, some provision must be made for permitting the plow to follow as closely behind the tractor as possible as the tractor turns a corner or follows a bend. For an extremely long plow, such as a multiple section plow, this steering obviously is important. Further, however, in the case of an adjustable width plow, it is necessary to adjust the steering wheel for all width adjustments, and in this adjustment it may further be required that the wheels be oriented to "toe" in a direction slightly inclined relative to the direction of travel of the vehicle in order to offset draft forces on the plow as it works the ground.

A multiple section adjustable width plow which incorporates both kinds of steering indicated above is disclosed in the Kinzenbaw U.S. Pat. No. 4,036,306, granted July 19, 1977; and the same plow is described with particular emphasis on the steering mechanism and its ability to toe the steering wheel in the Dietrich U.S. Pat. No. 4,049,063, granted Sept. 20, 1977. Another multiple section plow which does not provide for width adjustment is disclosed in the Ward U.S. Pat. No. 3,965,989, granted June 29, 1976.

As plows become larger and larger, some provision is made for permitting the frame to flex so that the system can better follow the contour of the ground to insure uniformity of plowing at the depth at which the system is set. As the power of tractors is increased, the length of the plow may be increased to the point where a large number of bottoms may be accommodated on a single plow. The present plow, for example, may accommodate from 16-21 plow bottoms, and in order to provide good contouring, it is desirable that it be divided into three sections, including a forward section, an intermediate section and a rear section. Obviously, the problems of steering around corners and adjusting the steering system in response to cutting width adjustments while also incorporating toeing to offset lateral draft for width adjustments, increase with the size of the plow.

In summary, the present invention includes a first pair of land wheels adapted to support the frame at a location adjacent the connection between the forward section and the intermediate section. A second pair of land wheels supports the system at a location adjacent the connection between the intermediate section and the rear section. A caster wheel is mounted at the forward end of the front section to run in a previously formed furrow, and a rear caster wheel is mounted to the rear plow section to run in the furrow formed by the last plow unit.

The forward land wheels are steered by a linkage mechanism connected to the tractor drawbar in such a manner that the wheels turn in response to the turning of the tractor and they are also adjusted for proper steering and toeing as the cutting width of the plows is adjusted.

The rear land wheels do not turn in response to the turning of the tractor, but they are adjusted for proper steering and toeing in response to width adjustment.

In normal turns, as the tractor turns, the forward land wheels are turned to follow the tractor, and the plow is pivoted about the rear land wheels, with the tail caster wheel swinging out during turning.

Both the forward land wheels and the rear land wheels are structured to toe out for a wide setting of the plows and to toe inwardly (that is, toward the right when viewing the system from the rear) for a narrow cutting width setting to compensate for the effect of changes in draft as the width of the plow changes. Further, the width adjustment mechanism also increases the distance between the right rear wheel of the tractor and the forward furrow wheel on the plow as the plow width increases to further assist in compensating for changes in horizontal line of draft.

An auxiliary hydraulic cylinder is incorporated into the steering mechanism for each of the land wheels to increase the maneuverability of the system, for example, around trees or fence posts. When these cylinders are actuated by the operator (also without leaving his driver's position), both sets of land wheels are turned clockwise. This is useful, for example, in a sharp left turn because it steers the plow sharply to the right to swing it widely about the turn and avoid any obstacles to the left. The same maneuverability may be achieved if it is desired to make a sharp turn to the right by increasing the cutting width to the widest adjustment. This will cause both land wheels to be rotated counterclockwise (when viewed from the top) and thereby swing the plow widely around the turn. These auxiliary steering mechanisms are operative together with the tractor steering of the forward land wheels.

Other features and advantages will be appreciated from the following detailed description of a preferred embodiment accompanied by the attached drawing wherein identical reference numerals will refer to like parts in the various views.

THE DRAWING

FIGS. 1 and 2 are plan views illustrating the operation of the major elements of the steering system for the present invention, with the system shown respectively in a relatively narrow width setting and a relatively wide width setting;

FIGS. 3 and 4 are fragmentary plan views showing the steering of the forward set of land wheels in response to the turning of the tractor;

FIG. 5 is a more detailed plan view of the system of FIG. 1 showing the forward and intermediate plow sections and the details of the width adjustment mechanism;

FIG. 6 is a fragmentary side view of the apparatus of FIG. 5 illustrating the interconnection between the forward and intermediate plow sections for pivotal motion about a horizontal axis;

FIG. 9 is a close up rear view of the steering mechanism for the land wheels showing the auxiliary hydraulic cylinder.

DETAILED DESCRIPTION

Figure 7:
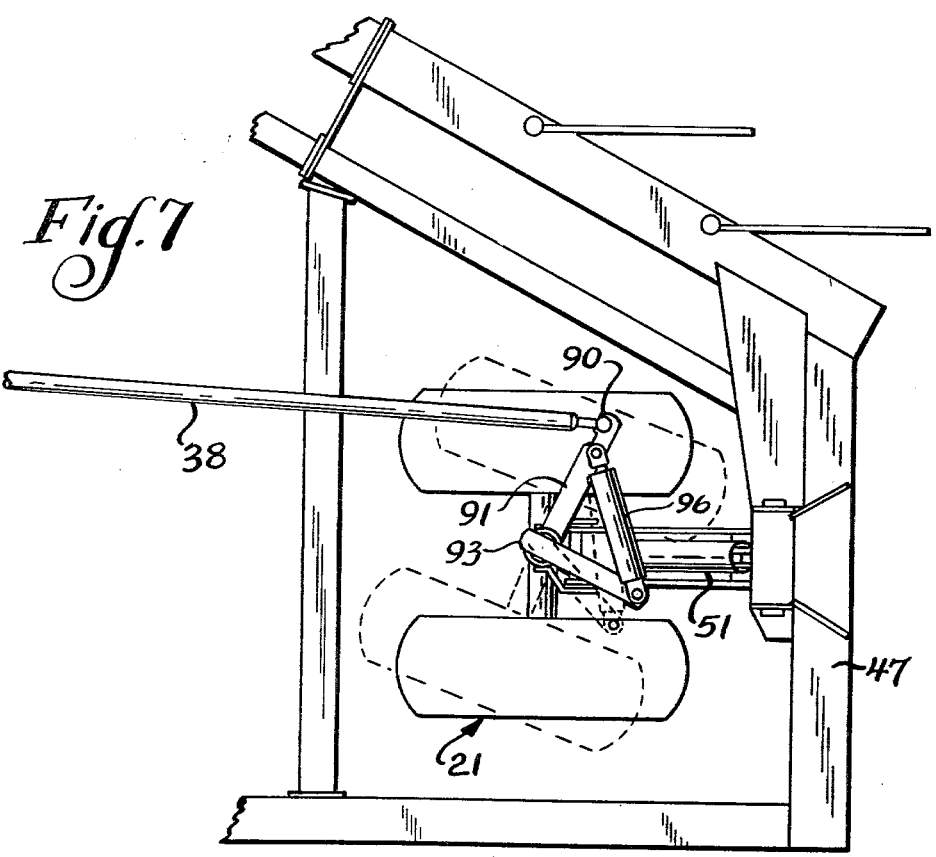
FIG. 7 is a close up fragmentary plan view illustrating the mechanism for steering the forward set of land wheels.

Before describing the structural details of the illustrated embodiment, it is believed that it would be helpful to an understanding if the overall functioning of the steering system were understood by reference to FIGS. 1 and 2 which diagrammatically illustrate the principal steering elements. Turning then to FIGS. 1 and 2, the illustrated plow is provided in three sections, including a front plow section 10, an intermediate plow section 11, and a rear plow section 12. Each of the plow sections includes, as a part of its frame, a main inclined beam; and these are designated respectively 14, 15 and 16 for the three plow sections. The beams 14–16 are longitudinally aligned in all positions of the plow.

A plurality of individual moldboard plows (referred to as "plow units") are pivotally mounted to each of the beams 14–16. The plow units are illustrated schematically at 17 for the first two sections of the plow in FIG. 5. Conventional moldboard plows may be used, and they may be mounted to their associated frames as illustrated in the Kinzenbaw U.S. Pat. No. 4,036,305 and connected together for rotation about their respective vertical axes in unison, as disclosed in the Dietrich U.S. Pat. No. 4,049,063. A guide bar diagrammatically illustrated by chain line 13 in FIG. 5 extends parallel to the main inclined beams and is connected to the forward portion of each plow unit to turn them in adjusting cutting width as disclosed in these patents.

By adjusting the width of the plows, it is meant that the lateral spacing between adjacent plows along a line perpendicular to the direction of travel of the vehicle is adjusted. For example, comparing FIGS. 1 and 2, if the plow units of the system of FIG. 1 are rotated counterclockwise, as the system is pulled forward, the moldboard plows will straighten out along the line of travel of the vehicle and the angle between the axis of the beams and the direction of travel will increase, as seen in FIG. 2. It will be observed that the lateral distance between the second and third plow units as illustrated by the arrow 18 in FIG. 1 increases to that shown at 18A in FIG. 2. The length of the arrow is representative of the cutting width of the plows and typically it may be continuously adjusted over a range of 12–22 in.

The structure for effecting width adjustment while at least partly compensating for changes in horizontal line of draft will be described subsequently.

Support wheels are located in four different places for supporting the plow system, including: (a) a forward caster wheel 20 located at the forward end of the front plow section 10 and adapted to ride in a previously formed furrow; (b) a forward set of land wheels generally designated 21 which is located to support the frame at a location where the forward plow section 10 is connected to the intermediate plow section 11; (c) a second or rear set of wheels also adapted to ride on previously unplowed ground and designated 22 for supporting the plow at a location between the intermediate section 11 and the rear section 12; and (d) a rear caster wheel 23 connected to a tail section 24 and placed to ride in the furrow formed by the rearmost plow unit.

In addition to the inclined main beam 14, the frame of the forward plow section 10 includes a transverse member 28 to which a tongue or draft member 29 is pivotally connected at 30. The forward end of the tongue 29 is pivotally connected at 31 to the tractor hitch 32 which is mounted on a drawbar 33. The forward land wheels 21 are mounted to a horizontal axle 34 which is turned by a spindle 35 the upper end of which is provided with a crank or arm 36. As will be described in further detail below, the actual steering mechanism includes an auxiliary hydraulic ram for purposes to be described. In the structure illustrated in FIGS. 1 and 2, however, the arm 36 is pivotally connected to a steering link 38 at a location designated 39; and the forward end of the link or rod 38 is pivotally connected at 40 to a bracket 41 attached to the drawbar 33. Preferably, suitable means are included for permitting the adjustment of the location of the pivotal connection 40 relative to the pivotal connection 31, such adjustment to include both a lateral adjustment and a fore and aft adjustment. The reason for this is to permit a fine adjustment of the steering mechanism for the forward land wheels as well as to adjust the toeing of those wheels, as will be discussed.

It will be observed from FIG. 1 that the pivot points 30, 31, 39 and 40 do not form a parallelogram. Rather, as the plow is opened (that is, the cutting width is increased as in changing from the position of FIG. 1 to that of FIG. 2), the pivot point 30 moves along a shorter arc than that of the pivot point 39. This will cause the arm 36 to rotate the land wheels 21 in a counterclockwise direction so that the land wheels not only steer properly in the adjusted position but also increase their outward toeing inclination to offset the effect of the change in horizontal draft on the plow due to its being opened (i.e. widened). When the plow is at a narrow setting in relation to the hitch point 31, it has a tendency to drag on the landslide of the plow units so the wheels are inclined inwardly (toward the right when viewing from the rear) for narrow settings. Conversely, they are inclined outwardly for wide settings. In addition, as will be described, the hitch point 31 is shifted in relation to furrow wheel 20 as the width adjustment is made.

The rear land wheels 22 are mounted to a frame appendage 44 connected to the rear of the inclined beam 15 of the second section 11; and they are not steered in response to the turning of the vehicle as diagrammatically illustrated. However, they are turned in response to the adjustment of the width of the plow so that they, like the forward land wheels 21, are not only properly oriented in the adjusted position, but are also properly toed (that is, turned increasingly to the left as the plow is opened) to assist in compensating for the lateral shift in draft on the overall system as the plow is opened. The mechanism for accomplishing the adjustment of the rear land wheels 22 is shown in more detail in FIG. 5 and may be similar to that which is disclosed in the Kinzenbaw U.S. Pat. No. 4,036,306.

To understand how the plow is turned around corners or bends, reference is made to FIGS. 3 and 4. For a full left turn, the connecting rod 38 is pulled forwardly to rotate the arm 36 and the land wheels 21 in a counterclockwise direction so that they are steered in the direction in which the tractor is steered. Because the rear land wheels 22 do not turn in response to the turning of the tractor, the entire plow will then pivot about the rear land wheels 22, the forward caster wheel 20 moving toward the tractor as illustrated by the arrow in FIG. 3 and the rear caster wheel 23 swinging around the land wheels 22.

Similarly, when the tractor turns full right as seen in FIG. 4, the connecting rod 38 turns the forward land wheels 21 clockwise so that they turn in the direction in which the tractor is turning; and the plow is rotated about the fixed land wheels 22.

Figure 8:
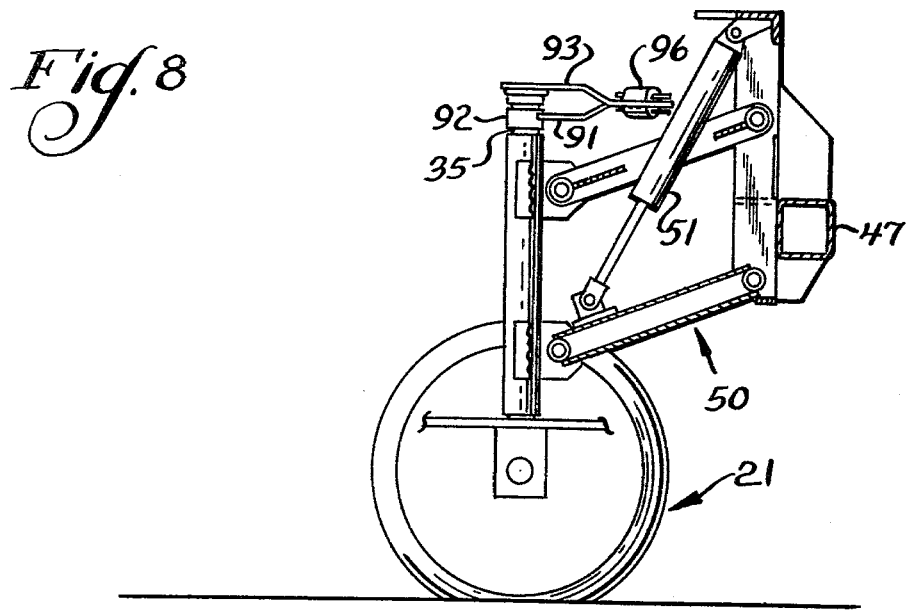
FIG. 8 is a vertical cross sectional view taken through the sight line 8—8 of FIG. 7.

Turning now to FIG. 5, the frame for the forward section 10 includes a second transverse member 47 connected to the rear of the main beam 14 for mounting the wheels 21 by means of a parallel linkage generally designated 50 in FIG. 8 so that the frame can be adjusted in height by means of a hydraulic cylinder and piston rod unit 51. This permits an adjustment of the plowing depth for the moldboard plow units, and it also permits the units to be raised above the ground for road travel.

The forward end of the intermediate plow section is connected for pivotal motion to the rear end of the forward section 10 by means of pins 53, 54, thereby permitting the intermediate section to rotate about a horizontal axis defined by the pins 53, 54 and follow the contour of the ground while maintaining the axis of the beam 15 in the same vertical plane as the axis of the beam 14. The guide bar which connects all of the individual plow units 17 together (diagrammatically illustrated by chain line 13 in FIG. 5) also permits the intermediate frame section to bend relative to the forward frame section. The rear frame section 12 may be similarly mounted for bending about a horizontal axis relative to the intermediate section 12, and again, the plow units on the rear section 12 are connected to the plow units on the intermediate section in a manner which permits this connection to bend as the plow sections follow the contour of the ground.

Still referring to FIG. 5, the mechanism for adjusting the width of the plows will now be described. The frame for the forward section 10 includes a left side frame member 60 and a forward transverse frame member 61, the left side of which is braced by a member 62 against the frame member 60; and the left side of the forward transverse frame member 61 extends above the tongue 29 and is at least partially supported on the tongue by means of a slide member 64 connected to the transverse frame portion 61 and received in a bearing member 65 attached to the tongue 29. A hydraulic cylinder and piston rod unit 66 is pivotally connected at 67 to the frame of the forward section 10 and at 68 to the tongue 29. A link 69 is pivotally connected at 70 to the tongue 29, and at 80 to the forward portion of one of the plow units 17 (in the illustrated embodiment, the fourth plow unit from the front). As the hydraulic cylinder 66 is extended (again, from a location adjacent the operator's position on the tractor), the forward transverse frame member 61 moves toward the right relative to the tongue 29, and the link 69, being based at one end against the tongue restrains the forward end of the plow unit to which it is connected, thereby causing that plow unit (and all others connected to guide bar 13) to rotate counterclockwise relative to the inclined beam 14. The action is transmitted to the plow units on the other plow sections relative to their associated inclined main beams 15 and 16. As the plow is then pulled forwardly, the plow units as well as the steering force on the front land wheels 21 and the rear land wheels 22 will cause the main inclined beams to rotate counterclockwise relative to the pivot location 30 between the frame and the tongue 29. Similarly, the plow may be closed to narrow the cut between adjacent plow units by retracting the cylinder 66.

The structure just described, particularly the stroke of cylinder 66, its location and relation to the link 69, cooperate to move the hitch point 31 to the left relative to furrow wheel 20 when the cutting width is increased. In other words, the distance from the pivot axis of furrow wheel 20 to the right rear tire of the tractor (see 81 in FIG. 1) increases to 81A in FIG. 2 as the plow is opened. This action cooperates with the toeing of the land wheels to compensate for changes in horizontal draft on the plow as the cutting width is changed. For a large plow, the shift in the hitch axis may be 4 ft., for example, over the complete adjustment range for the plow. The entire steering and adjustment of width could be just as well done with hydraulic master and slave cylinders.

Turning now to the rear land wheels 22, they are also connected to a common axle 82 and turn in unison by means of a vertical spindle 83 to the top of which is connected an arm 84. The outboard end of the arm 84 is pivotally connected to a link 86, the other end of which is connected to one of the plow units designated 17A. As the plow is opened, the unit 17A, in unison with the other such units, will rotate counterclockwise, thereby causing the wheels 22 to rotate counterclockwise relative to the main inclined beam 15 by means of the structure just described. The rear land wheels 22 are connected to the transverse frame member 44 by means of a parallel linkage and hydraulic cylinder unit similar to that shown in FIG. 8 for the forward land wheels so that this portion of the plow may also be raised for adjusting plow depth or for road travel.

Thus, the rear land wheels 22 are not steered in response to the turning of the tractor, but they are adjusted in response to the adjustments in the cutting width. Further, the dimensions of the link 86, the length of the crank arm 84 and the location of the pivotal connections are such that the rear wheels 22 are toed further outwardly for wider cut widths to offset for the leftward shift of the net draft force on the plow as described above.

Turning now to FIG. 7, the preferred structure for turning the forward land wheels 21 will now be described; and a similar structure is provided for the rear land wheels 22, as persons skilled in the art will readily understand. The steering link 38 is pivotally connected at 90 to a link 91, the inboard end of which is welded to a sleeve 92 journaled on the spindle 35 which turns the wheels. The upper end of the spindle 35 is welded to a second link 93 which is pivotally connected at 94 to the cylinder end of a hydraulic cylinder and piston rod unit generally designated 96. The rod end of the cylinder unit 96 is pivotally connected at 97 to an intermediate location on the link 91. The links 91 and 93 are bent so that the connections 94 and 97 are aligned axially with the line of force exerted by the hydraulic unit 96.

It will be observed that so long as the unit 96 is retracted, the steering of the forward land wheels 21 is the same as has been described above-namely, when the tractor turns left, the tie rod 38 causes the wheels to turn left. This happens because the link 91 rotates counterclockwise, thereby pulling the link 93 counterclockwise through the agency of the hydraulic cylinder 96. The angular rotation of the two links is the same so the steering is not affected.

The hydraulic cylinder unit 96, which is sometimes referred to as an auxiliary hydraulic unit, is used to move the plow sharply to the right. A maneuver of this type may be useful either in steering the plow around a tree or fence without moving the tractor, or it may be used during road travel when the plow units have been adjusted to their narrowest width, to cause the plow to swing widely around a turn. This is accomplished by extending the auxiliary cylinder 96. This will cause the link 93 to rotate clockwise thereby causing the wheels 22 to rotate to the position shown in phanthom in FIG. 7 irrespective of the position of the link 91 since the link 91 has its inboard end journaled about the spindle 35. A similar auxiliary hydraulic unit and cranking structure generally designated 99 is incorporated into the steering for the rear land wheels 22. This is not to say that the land wheels 22 are responsive to the turning of the vehicle for they are not. However, if the associated hydraulic cylinder unit is extended (preferably, by actuating the same valve which extends the unit 96), the rear land wheels 22 are also turned toward the right to assist in a left turn that may be obstructed by an object.

The same effect can be obtained during a right turn simply by opening the plow units fully. If this is done with the plow units in a raised condition (that is, not in a plowing position), the forward land wheels 21 will be steered toward the left (that is, toward the adjusted position), as will the rear land wheels 22. The operator therefore has the ability to move the plow sharply to the right or the left independent of the steering of the vehicle by virtue of the auxiliary cylinders just described.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. An adjustable width plow adapted to be pulled by a tractor comprising a forward section, an intermediate section and a rear section, each including a frame; means for connecting adjacent ends of said frames of said sections together for relative pivotal motion about horizontal axes; a plurality of plow units on said frame of each of said sections, said units being connected together and mounted for rotation about respective vertical axes in unison; first support wheel means for supporting said frames adjacent the rear end of said first section and adapted to run on unplowed land; first steering means for steering said first support wheel means in response to the turning of said tractor, said steering means being further responsive to the setting of the cutting width of said plow units for adjusting said first support wheel means to steer in the proper direction under plowing operation at the adjusted width setting of the plow units; second support wheel for supporting said frames adjacent the rear end of said intermediate section and adapted to run on unplowed land and including means for turning said second support wheel means in response to the setting of the cutting width of said plow units but not in response to the turning of said tractor; and support caster wheel means for supporting said frames.

2. The apparatus of claim 1 further comprising a tongue pivotally connected at its forward end to a drawbar of said tractor and pivotally connected at its rear end to the frame of said plow, and wherein said first steering means includes a connecting rod pivotally connected at its forward end to the drawbar of said tractor at a position laterally displaced from the connection of said tongue to said drawbar, said connecting rod pivotally connected at its rear end to link means for turning said first support wheel means.

3. The apparatus of claim 2 wherein said link means includes a vertical spindle for turning said first support wheel means; a first laterally extending arm rigidly connected to said spindle; a second laterally extending arm journaled on said spindle and having its outboard end pivotally connected to the rear end of said connecting rod; and a hydraulic cylinder having its rod end pivotally connected to one of said links and its butt end pivotally connected to the other of said links, whereby when said cylinder is extended, said links are spread apart and said support wheel means are turned to the right.

4. The apparatus of claim 3 wherein said steering means for said second support wheel means includes a vertical spindle for turning said second support wheel means, a third laterally extending link connected rigidly to said spindle, a fourth laterally extending link journaled on said second spindle, and a second hydraulic cylinder and piston rod unit connected between said third and fourth links.

5. The apparatus of claim 4 wherein said fourth laterally extending link for steering said second steering wheel means is connected to one of said plow units on said intermediate plow section.

6. The apparatus of claim 1 further comprising hydraulic power means for raising said frame relative to said first and second support wheel means.

7. The apparatus of claim 1 wherein said support caster wheel means includes a first caster wheel located at the forward end of said forward plow section and adapted to ride in a previously formed furrow, and a second caster wheel mounted at the rear of said rear plow section and adapted to ride in a furrow formed by the rearmost plow unit.

8. The apparatus of claim 1 further including a forward furrow wheel for supporting the forward end of said plow and adapted to ride in a previously formed furrow, said plow being characterized in that as said plow units are adjusted to a wider cutting width, said forward furrow wheel continues to ride in a previously formed furrow and the lateral distance between said forward furrow wheel and the right rear wheel of the tractor pulling said plow increases to thereby shift the point of draft away from said furrow wheel for wider settings of said plow units.

9. The apparatus of claim 1 characterized in that both said first and second support wheel means are inclined to toe in a direction to offset the lateral force created by the operation of said plowing units such that for narrow width adjustments of said plow units, said first and second support wheel means are inclined toward the right side of the line of travel of said vehicle and for wider lateral settings of said plow units, said first and second support wheel means are inclined toward the left of the center line of travel of said tractor.

10. An adjustable width plow adapted to be pulled by a tractor comprising a forward section and a rear section each including a frame; means for connecting adjacent ends of said frames of said sections together for relative pivotal motion about a horizontal axis; a plurality of plow units on said frame of each of said sections, said units being connected together and mounted for rotation about respective vertical axes in unison; support wheel means for supporting said frames adjacent the rear end of said forward section and adapted to run on unplowed land; steering means for steering said first support wheel means in response to the turning of said tractor, said steering means being further responsive to the setting of the cutting width of said plow units for adjusting said support wheel means to steer in the proper direction under normal operation at the adjusted width setting of the plow units; and extendable power link means in said steering means for turning said support wheel means when actuated by an operator even though said tractor may be headed straight but adding to the turning of said tractor in the same direction as said extendable link means turns said wheel means.

* * * * *

UNITED STATES PATENT AND TRADEMARK OFFICE
CERTIFICATE OF CORRECTION

PATENT NO. : 4,282,935
DATED : August 11, 1981
INVENTOR(S) : William J. Dietrich It is certified that error appears in the above—identified patent and that said Letters Patent is hereby corrected as shown below:

Column 7, line 68, after "wheel" insert -- means --.

Signed and Sealed this

Seventeenth Day of November 1981

[SEAL]

Attest:

GERALD J. MOSSINGHOFF

Attesting Officer  Commissioner of Patents and Trademarks